(12) United States Patent
Chen

(10) Patent No.: US 7,262,237 B2
(45) Date of Patent: Aug. 28, 2007

(54) TIME RELEASED CURING SYSTEM

(75) Inventor: Jimmy Pingao Chen, Prospect, KY (US)

(73) Assignee: Hexion Specialty Chemicals, Inc., Columbus, OH (US)

(*) Notice: Subject to any disclaimer, the term of this patent is extended or adjusted under 35 U.S.C. 154(b) by 108 days.

(21) Appl. No.: 10/875,877

(22) Filed: Jun. 24, 2004

(65) Prior Publication Data

US 2005/0070646 A1    Mar. 31, 2005

(30) Foreign Application Priority Data

Sep. 26, 2003    (WO) .................... PCT/US03/30459

(51) Int. Cl.
| | |
|---|---|
| *C08G 18/77* | (2006.01) |
| *C08J 3/00* | (2006.01) |
| *C08K 5/49* | (2006.01) |
| *C08L 61/22* | (2006.01) |
| *B32B 21/02* | (2006.01) |

(52) U.S. Cl. ................ 524/115; 428/292.4; 428/317.1; 428/317.7; 428/319.3; 428/524; 428/526; 428/528; 524/147; 524/151; 524/153; 524/597; 528/238; 528/242; 528/243; 528/259

(58) Field of Classification Search ............. 428/292.4, 428/317.1, 317.7, 319.3, 524, 526, 528; 524/115, 524/147, 151, 153, 597; 528/238, 242, 243, 528/259

See application file for complete search history.

(56) References Cited

U.S. PATENT DOCUMENTS

| | | | |
|---|---|---|---|
| 4,268,351 A | 5/1981 | Henbest et al. ............. | 162/146 |
| 5,096,983 A | 3/1992 | Gerber ....................... | 525/506 |
| 5,296,520 A | 3/1994 | Gerber ....................... | 524/128 |
| 6,133,403 A | 10/2000 | Gerber ....................... | 528/218 |

FOREIGN PATENT DOCUMENTS

EP    0 869 980 B1    2/2003

OTHER PUBLICATIONS

International Search Report; International Application No. PCT/US03/30459; International Filing Date Sep. 26, 2003; 6 pages.

*Primary Examiner*—Patrick Niland

(57) ABSTRACT

Curable urea formaldehyde binder compositions are provided which are useful in coated abrasive and wood engineering applications, in a time released fashion. The time released curable binder compositions include a urea formaldehyde resin and an aryl phosphite in varying concentrations. The curable binder compositions of the present invention provide desirable working times and faster curing times tinder ambient or near ambient conditions.

15 Claims, No Drawings

TIME RELEASED CURING SYSTEM

FIELD OF THE INVENTION

The present invention relates to a curable urea formaldehyde binder composition useful in coated abrasive and engineering wood products. The composition includes a curable urea formaldehyde resin and an aryl phosphite.

BACKGROUND OF THE INVENTION

This invention relates to abrasive articles in which a thin layer or, more usually, a single layer of abrasive grit is adhesively bonded to a backing. Such products are coated abrasives, more commonly referred to as "sandpaper," and fibrous abrasive pads, for example. Conventionally, glue or thermosetting resins such as phenol formaldehyde resins ("PF resins") and urea formaldehyde resins ("UF resins") have been used in coating formulations. UF resins, which are less expensive than phenolic resins, have been used to reduce the cost in abrasive products. However, current UF resin systems used in the manufacture of coated abrasive products do not provide desirable working times and curing times under ambient or near ambient conditions. The coated abrasive industry is seeking time released curable urea formaldehyde binder compositions in order to have enough working time, yet faster curing to provide a sharp image and non-curled sand paper.

Phenolic resin compositions are known that can cure at ambient temperatures with rapid cure at modestly higher temperatures. Such resins, as in U.S. Pat. No. 5,296,520 to Gerber, provide controlled work time for hardening phenolic resins at ambient temperature using aryl phosphite latent acid catalysts. However, Gerber found that urea and other amide compounds were very effective retarders of ambient temperature hardening of the resin with the aryl phosphite hardening agents.

Nevertheless, UF resins are different from phenolic resins and each have vastly different chemistry and methods of manufacture. UF resins are prepared by a condensation whereby the nitrogen of urea reacts with the carbonyl group of formaldehyde. In contrast, an exemplary phenolic polymer is a phenol formaldehyde resin prepared by aromatic substitution of the multiple activated sites of a phenol, initially by formaldehyde, followed by reaction with other reactive intermediates. In the preparation of phenolic resins, catalysts such as strong base, zinc acetate, and borates can be used to provide phenolic resoles, while strong acid can be used to provide phenolic novolacs. UF resins can be prepared using a strong acid catalyst, such as, for example, sulfuric acid. Structurally, phenolic resins are highly aromatic, and contain aromatic end groups. In contrast, UF resins are amino resins and essentially non-aromatic. Regarding curing properties, phenolic polymers range from thermosetting resoles to thermoplastic novolacs. UF resins are thermosetting resins. Accordingly, PF resin chemistry is not predictive of UF resin chemistry, as shown by Gerber, op.cit.

UF precondensates can be blended with liquid phenolic resin systems. However, such systems are catalyzed by providing a basic environment (pH above 7), in contrast to the acid catalyst used for unblended urea formaldehyde prepolymers.

Accordingly, curable urea formaldehyde binder compositions employing a latent acid hardening component are needled that will provide desirable working times and curing times under ambient or near ambient conditions. The results presented below provide surprising and unexpected improvements in urea formaldehyde based binder compositions.

SUMMARY OF THE INVENTION

In one embodiment of the present invention, there is provided a curable binder composition, including:
a urea formaldehyde resin; and
an aryl phosphite.

In another embodiment of the present invention, there is provided a curable binder composition, including
a urea formaldehyde resin; and
an aryl phosphite in an amount ranging from about 0.05% by weight to about 15% by weight, based on the total weight of the resin.

DETAILED DESCRIPTION OF THE INVENTION

There is provided in accordance with one embodiment of the present invention a curable binder composition using varying concentrations of aryl phosphites. The unique advantages of the curing system include: improvement in the color of the urea formaldehyde binder to enhance the final product appearance, such as in sand paper; and faster curing to save energy in the engineering wood products industry. The color improvement is largely due to the aryl phosphite component. Aryl phosphites, acting as anti-oxidants, are known as stabilizers in a wide range of polymers.

In another embodiment of the present invention there is provided a time released curable urea formaldehyde binder composition. It has been discovered that aryl phosphites, for example triphenyl phosphite, act as accelerators in the pre-formulated curable binder, but in a time released fashion, wherein the determining parameter is temperature. For example, the curing system is stable under about 70° F. (about 21° C.), but the curing reaction accelerates above about 80° F. (about 27° C.). Working times range from about 0.5 hours to over 100 hours the aryl phosphites of the present invention can be used in an amount ranging from about 0.05% by weight based on the total weight of the resin to about 15% by weight based on the total weight of the resin. Urea formaldehyde resins are particularly useful in the binder compositions. Thus, this time released curable binder composition is useful for coated abrasive products and engineering wood applications.

The terms "hardening" and "curing" are used interchangeably herein.

The aryl phosphite hardeners of this invention are esters of phosphorous acid which have: two aromatic organic ester groups and an acid hydrogen, three aromatic ester groups, or two aromatic ester groups and one alkyl group. Illustratively, the hardener can be a disubstituted phosphorous acid ester such as diphenyl hydrogen ("DPP") or a trisubstituted phosphorous acid ester such as a triphenyl phosphate ("TPP").

In the presence of water, the aryl phosphites of this invention hydrolyze in a controllable manner over a period of time to stronger acidic products and eventually to phosphorous acid. Phosphorous acid is a strong acid having an ionization constant $pK_a$ of 1.20. Phosphorous acid is sufficiently acidic to provide ambient temperature hardening or near ambient temperature hardening of urea formaldehyde resins.

The aryl phosphite hardening agents of this invention can be represented by the general formula (I)

$$(Ar-O)_2-P-OX \qquad (I)$$

wherein Ar is aryl and X is selected from hydrogen, aryl, or alkyl. The aryl phosphites having two ester groups and a hydrogen atom, e.g. diphenyl hydrogen phosphite, are also referred to herein and in the literature as simply by the name of the ester groups and omit the hydrogen, e.g., diphenyl phosphite ("DPP"). Useful aryl phosphite hardeners include: diphenyl hydrogen phosphite (DPP); dicresyl (preferably meta or para) hydrogen phosphite; phenyl p-cresyl hydrogen phosphite; phenyl m-cresyl hydrogen phosphite; dinaphthyl hydrogen phosphite; diphenyl isopropyl phosphite; diphenyl methyl phosphite, di(p-cresyl)hexyl phosphite, triphenyl phosphite (TPP), tri(m-cresyl)phosphite, diphenyl isooctyl phosphite, diphenyl 2-ethylhexyl phosphite, diphenyl isodecyl phosphite, diphenyl cyclohexyl phosphite, 2-chloroethyl diphenyl phosphite, and the like. One useful commercial DPP solution is DOVERPHOS 213, available from Dover Chemical Corp., Dover, Ohio. One useful commercial TPP solution is DOVERPHOS 10, available from Dover Chemical Corp., Dover, Ohio.

The work time of the resin can vary over a broad range by varying the total water content, the use of retarder or accelerator additives, the specific phosphite hardening agent, and its quantity, and temperature. The room or ambient temperature hardening compositions of this invention can have a working time of about 15 minutes up to about 20 hours. The Shore D hardness can be measured by use of a Durometer Type D of the Shore Instrument & Manufacturing Company located in New York. Another test for ambient temperature hardening is measured by use of a stick applicator wherein the composition consisting of the urea formaldehyde resin, aryl phosphite and water is "stick hard" as described in the Qualitative Flow Procedure set forth hereafter within 24 hours or less after mixing. The ambient temperature hardening compositions are preferably those having either a diaryl hydrogen phosphite, a triaryl phosphite or a diaryl monoalkyl phosphite. The triaryl phosphite or diaryl mono alkyl phosphite can be pre-hydrolyzed with from about 1% to 10% of water based on the weight of the aryl phosphite. The phosphites having 3 organic substituents can be pre-solvolyzed with water, alkanol, glycol, and mixtures thereof. The aryl phosphites of the present invention can be formulated with accelerators. However, these pre-treatments would dampen the time release aspect of the present invention.

Aryl phosphites having three organic substituents, such as triaryl phosphites or diaryl monoalkyl phosphites, are preferably used as latent hardeners to provide extended periods of stability at ambient temperature for the hardenable compositions and rapid hardening at moderately elevated temperatures such as those not above 60° C., e.g., about 35° C. to 50° C. Thus, such hardeners can remain fluid for a period of 5 hours or more at a temperature of about 23° C., but cure rapidly at the higher temperatures, depending on the level of the aryl phosphite. However, by use of low concentrations of diaryl hydrogen phosphites, or small concentrations of water or with retarders, diaryl hydrogen phosphites as well as triaryl phosphites or diaryl monoalkyl phosphites can also have extended periods of ambient temperature stability and then be rapidly hardened at moderately elevated temperatures.

The viscosity of the basic ingredients, i.e., urea formaldehyde resin, aryl phosphite, and water, is capable of remaining flowable at ambient temperature for a period of several hours up to over 100 hours, based on the concentration of aryl phosphite.

The quantity of the aryl phosphite used in this invention can vary over a wide range. For example, in the curable urea formaldehyde binder of the present invention, a preferred range of aryl phosphite can be present in an amount ranging from about 0.05% by weight to about 15% by weight, based on the total weight of the resin. When DPP is used, a more preferred range is from about 0.1% by weight to about 2% by weight, based on the total weight of the resin; and a most preferred range is from about 0.30% by weight to about 2% by weight, based on the total weight of the resin. When TPP is used, a more preferred range is from about 0.25% by weight to about 5% by weight, based on the total weight of the resin.

The urea formaldehyde resins ("UF resins") of the present invention are aqueous resins and are hardenable using hardeners or accelerators. For example, useful UF resins have a UF molar ratio ranging from about 1:1 to about 1:3.5. The UF resins of the present invention can have a p1-I range of from about 4 to about 9. In the present invention, formaldehyde scavengers can be employed, e.g. urea, that can be back-added to a urea-formaldehyde resin. Modified UF resins can be used in the binders of the present invention.

Urea-aldehyde resins employed in the coatable binder precursor compositions useful in the invention may be comprised of urea or any urea derivative and any aldehyde which are capable of being rendered coatable, have the capability of reacting together at an accelerated rate in the presence of a catalyst, and which afford an abrasive article with abrading performance acceptable for the intended use. The resins comprise the reaction product of an aldehyde and a urea. Urea-formaldehyde resins are preferred in the abrasive industry, as noted above, because of their thermal properties, availability, low cost, and ease of handling. The urea-aldehyde resins preferably are 30-95% solids, more preferably 60-80% solids, with a viscosity ranging from about 125 to about 1500 cps (Brookfield viscometer, number 3 spindle, 30 rpm, and 25.degree. C.) before addition of water and catalyst and have molecular weight (number average) of at least about 200, preferably varying from about 200 to 700.

A preferred urea-aldehyde resin for use in the present invention is that known under the trade designation "AL3029R" from Borden Chemical, Inc., Columbus, Ohio. This is an unmodified. (i.e. contains no furfural) urea-formaldehyde resin, 65% solids viscosity (Brookfield, #3 spindle, 30 rpm, 25° C.) of 325 cps, a free formaldehyde content of 0.1-0.5 weight percent.

Lowering the pH of the urea formaldehyde resins to about 4 or above by use of acids that are as acidic or more acidic than phosphorous acid, i.e., acids having a pK~of 1.20 or less increases the hardening rate of the resin with the aryl phosphite in comparison to the use of acids having a higher $pK_a$. Illustrative of acids which have a $pK_a$ of 1.2 or less there can be mentioned: sulfamic, oxalic, dichloroacetic, trichloroacetic, methanesufonic, sulfuric, hydrochloric and phenol sulfonic acids. Ammonium chloride can be used as a source of hydrochloric acid and/or a buffer solution component. Lowering the p1-1 with acids which are less acidic than phosphorous, such as acetic, formic, benzoic, and salicylic acids 1e~ds to lower reactivity with the phosphite than when the acid is equal to or greater in acidity than phosphorous acid.

Catalysts can also be used in the curable binders of the present invention. Examples of useful catalysts include but are not limited to Lewis acids, for example, aluminum chloride and the like. Preferred are those Lewis acids selected from the group consisting of aluminum chloride, iron (III) chloride, and copper (II) chloride. Particularly preferred is the Lewis acid aluminum chloride in either its non-hydrated form (AlCl$_3$) or hexahydrate form (AlCl$_3$.6H$_2$O). Useful catalysts also include aqueous organic amine salt or ammonium ion salt. If an ammonium ion salt is used it is preferably a salt of ammonium (NJ-I$_{4-}$) audi a halide ion such as chloride ion (Cl$^-$), fluoride ion (F$^-$), bromide ion (Br$^-$), and the like. A particularly preferred ammonium ion salt is ammonium chloride (NH$_4$Cl). Ammonium sulfate ((NH$_4$)$_2$SO$_4$), ammonium peroxydisulfate ((NH$_4$)$_2$S$_2$O$_8$), ammonium thiosulfate ((NH$_4$)$_2$S$_2$O$_3$), and ammonium nitrate (NH$_4$NO$_3$) are deemed suitable for use in the invention as useful ammonium ion salts when used specifically in combination with Aid$_3$ as cocatalyst. Mixtures of inorganic and organic salts are typically, and in some cases, preferably utilized.

The hardening reaction of this invention requires water in order to hydrolyze the aryl phosphite, e.g., eventually to phosphorous acid. The total water content in the composition, i.e. water available for hydrolyzing the phosphite, can vary over a broad range such as that of about 0.15 to 5 parts of water by weight for each part by weight of the aryl phosphite, preferably from about 0.3 to 3 parts of water by weight for each part of the phosphite. The requisite total water content can come from any of the ingredients in the composition, e.g., the urea formaldehyde resin, or additional water can be added to the composition.

The compositions of this invention can include fillers, modifiers, and aggregates which are conventionally used with urea formaldehyde resins. The aggregate material may be a particulate material such as that in granular, powder, or flake form. Suitable aggregate materials include but are not limited to: sand, alumina, zirconia, silica, zircon sand, olivine sand, silicon carbide, silicon nitride, boron nitride, bauxite, quartz, chromite, and corundum and mixtures thereof. For certain applications, low density aggregate materials such as vermiculite, perlite, and pumice are preferred. For other applications, preferable high density aggregates include: quartz sand, gravel, crushed rock, and broken brick. Fillers such as mica, kaolin, wollastonite, and barites can be used. The compositions of the present invention can be used to make coated abrasive articles, for example, sand paper.

Coatable binder compositions useful in the present invention can contain fillers, fibers, lubricants, grinding aids, antistatic agents, wetting agents, and other additives such as surfactants, pigments, dyes, coupling agents, plasticizers, dispersants, and suspending agents. The amounts of these materials are selected to give the properties desired, for example improvement of the wettability of abrasive grains. Alternatively, useful binder precursor compositions may be formulated without these additives, and the additives mixed into the binder precursor just prior to coating onto a substrate.

The binder compositions of the present invention can include formaldehyde scavengers such as, for example, urea and ammonium compounds.

Fillers are frequently used in abrasive articles to reduce cost and improve dimensional stability and other physical characteristics. Fillers can be selected from any filler material that does not adversely affect the rheological characteristics of the binder precursors or the abrading performance of the resulting abrasive article. Preferred fillers include calcium metasilicate, aluminum sulfate, alumina trihydrate, cryolite, magnesia, kaolin, quartz, and glass. Fillers that function as grinding aids are cryolite, potassium fluoroborate, feldspar, and sulfur. Fillers can be used in varying amounts limited only by the proviso that the abrasive article retains acceptable mechanical properties (such as flexibility and toughness).

Coated abrasive articles of the invention may be produced by incorporating cured versions of the coatable binder precursor compositions described above. The backing may either be a polymeric film, paper sheet, or laminate.

For wood engineering applications, e.g. composite panels and the like, lignocellulosic materials can be used. Examples of lignocellulosic materials include, but are not limited to, wood fiber, wood flake, wood strands, wood chips and wood particles, straw, bagasse, wood bark, recycled wood fiber, recycled paper fiber, and mixtures thereof. The composite panels produced are known as fiberboard, waferboard, strandboard, oriented stransboard, flake board, particleboard and the like.

Several comparison experiments illustrate the utility of the present invention. These experiments were designed for abrasive and wood applications; therefore, co-catalysts were introduced into the binder formulations. The units for the components of Curable Binders A-B were based on the UF resin being set to a given mass and all other components were then set to parts per mass of given UF resin. The hardening experiments using Curable Binders A-B with viscosity measurements and observations are presented in Table 1. Viscosity readings were determined using a Brookfield Viscometer, Model DV-11+, #18 Spindle, 20 rpm, and the viscosity units are in centipoises (cps). All reaction times are calculated from the time of initial mixing of all the components.

| Comparison Binder A | |
|---|---|
| AL3029R | 70 |
| Water | 7 |
| 25% ammonium chloride | 3.64 |
| 28% aluminum chloride | 0.49 |

The components were mixed thoroughly in the order above at ambient temperature, then placed in a 15-20° C. bath. 5 hours from initial mixing, the viscosity of the reaction mixture was 116.8 cps. After 5 hours, 30 minutes, the mixture was placed in a 32° C. oven. After 6 hours, 10 minutes, the viscosity of the reaction mixture was 136.5 cps.

| Curable Binder A1 | |
|---|---|
| AL3029R | 70 |
| Water | 7 |
| 25% ammonium chloride | 3.64 |
| 28% aluminum chloride | 0.49 |
| DOVERPHOS 10 | 0.84 |

The components were mixed thoroughly in the order above at ambient temperature, then placed in a 15-20° C. bath. 4 hours, 55 minutes from initial mixing, the viscosity of the reaction mixture was 122.7 cps. After 5 hours, 20 minutes, the mixture was placed in a 32° C. oven. After 6 hours, 5 minutes, the viscosity of the reaction mixture was 149.4 cps.

| Curable Binder A2 | |
|---|---|
| AL3029R | 70 |
| Water | 7 |
| 25% ammonium chloride | 3.64 |
| 28% aluminum chloride | 0.49 |
| DOVERPHOS 10 | 1.26 |

The components were mixed thoroughly in the order above at ambient temperature, then placed in a 15-20° C. bath. 4 hours, 50 minutes from initial mixing, the viscosity of the reaction mixture was 128.3 cps. After 5 hours, 10 minutes, the mixture was placed in a 32° C. oven. After 6 hours, the viscosity of the reaction mixture was 159.2 cps.

| Curable Binder A3 | |
|---|---|
| AL3029R | 70 |
| Water | 7 |
| 25% ammonium chloride | 3.64 |
| 28% aluminum chloride | 0.49 |
| DOVERPHOS 10 | 3.5 |

The components were mixed thoroughly in the order above at ambient temperature, then placed in a 1.5-20° C. bath. 4 hours, 50 minutes froth initial mixing, the viscosity of the reaction mixture was 156.3 cps. After 5 hours, 5 minutes, the mixture was placed in a 32° C. oven. After 6 hours, the viscosity of the reaction mixture was 208.2 cps.

| Curable Binder A4 | |
|---|---|
| AL3029R | 70 |
| Water | 7 |
| 25% ammonium chloride | 3.64 |
| 28% aluminum chloride | 0.49 |
| DOVERPHOS 213 | 0.21 |

The components were mixed thoroughly in the order above at ambient temperature, then placed in a 15-20° C. bath. 4 hours, 45 minutes from initial mixing, the viscosity of the reaction mixture was 188.2 cps. After 4 hours, 55 minutes, the mixture was placed in a 32° C. oven. After 6 hours, the viscosity of the reaction mixture was 456.5 cps. The viscosity continued to rise at about 3.5 cps/second.

| Comparison Binder B | |
|---|---|
| AL3029R | 70 |
| Water | 7 |
| 25% ammonium chloride | 3.64 |
| 28% aluminum chloride | 0.49 |

The components were mixed thoroughly in the order above at ambient temperature, then place in a 15-20° C. bath. 4 hours, 15 minutes from initial mixing, the viscosity of the reaction mixture was 116 cps. After 4 hours, 30 minutes, the mixture was placed in a 32° C. oven. After 5 hours, 10 minutes, the viscosity of the reaction mixture was 125.4 cps.

| Curable Binder B1 | |
|---|---|
| AL3029R | 70 |
| Water | 7 |
| 25% ammonium chloride | 3.64 |
| 28% aluminum chloride | 0.49 |
| DOVERPHOS 213 | 0.07 |

The components were mixed thoroughly in the order above at ambient temperature, then placed in a 15-20 ad bath. 4 hours, 10 minutes from initial mixing, the viscosity of the reaction mixture was 121.8 cps. After 4 hours, 20 minutes, the mixture was placed in a 32° C. oven. After 5 hours, the viscosity of the reaction mixture was 139.2 cps.

| Curable Binder B2 | |
|---|---|
| AL3029R | 70 |
| Water | 7 |
| 25% ammonium chloride | 3.64 |
| 28% aluminum chloride | 0.49 |
| DOVERPHOS 213 | 0.14 |

The components were mixed thoroughly in the order above at ambient temperature, then placed in a 15-20° C. bath. 4 hours, 10 minutes from initial mixing, the viscosity of the reaction mixture was 130.1 cps. Then the mixture was placed in a 32° C. oven. After 4 hours, 50 minutes, the viscosity of the reaction mixture was 164.3 cps.

| Curable Binder B3 | |
|---|---|
| AL3029R | 70 |
| Water | 7 |
| 25% ammonium chloride | 3.64 |
| 28% aluminum chloride | 0.49 |
| DOVERPHOS 213 | 0.84 |

The components were mixed thoroughly in the order above at ambient temperature, then placed in a 15-20° C. bath. 2 hours, 40 minutes from initial mixing, the reaction mixture had gelled, and was still soft.

TABLE 1

VISCOSITY MEASUREMENTS AND OBSERVATIONS

| Binder/Time[2]/Temperature | Phosphite level (%)[1] | Viscosity (cps) | % Increase/ Control |
|---|---|---|---|
| A/5 hours/15° C. | — | 116.8 | |
| A/6 hours, 10 minutes/32° C. | — | 136.5 | |
| A1/4 hours, 55 minutes/15° C. | 1.2 (TPP) | 122.7 | |
| A1/6 hours, 5 minutes/32° C. | 1.2 (TPP) | 149.4 | 9.4 |
| A2/4 hours, 50 minutes/15° C. | 1.8 (TPP) | 128.3 | |
| A2/6 hours/32° C. | 1.8 (TPP) | 159.2 | 16.6 |
| A3/4 hours/50 minutes/15° C. | 5.0 (TPP) | 156.3 | |
| A3/6 hours/32° C. | 5.0 (TPP) | 208.2 | 52.5 |
| A4/4 hours, 45 minutes/15° C. | 0.3 (DPP) | 188.2 | |
| A4/6 hours/32° C. | 0.3 (DPP) | 456.5 | 334 |
| B/4 hours, 15 minutes/15° C. | — | 116 | |
| B/5 hours 10 minutes/32° C. | — | 124.5 | |
| B1/4 hours, 10 minutes/15° C. | 0.1 (DPP) | 121.8 | |
| B1/5 hours/32° C. | 0.1 (DPP) | 139.2 | 11.8 |
| B2/4 hours, 10 minutes/15° C. | 0.2 (DPP) | 130.1 | |

TABLE 1-continued

VISCOSITY MEASUREMENTS AND OBSERVATIONS

| Binder/Time[2]/Temperature | Phosphite level (%)[1] | Viscosity (cps) | % Increase/Control |
|---|---|---|---|
| B2/4 hours, 50 minutes/32° C. | 0.2 (DPP) | 164.3 | 32.0 |
| B3/2 hours, 40 minutes/15° C. | 1.2 (DPP) | Not measurable, Gelled | |

[1]Based on resin weight; Phosphite is indicated as DPP or TPP
[2]Time is cumulative for each example As shown in Table 1 above, the binder compositions of the present invention can be engineered to cure in a time released fashion useful for making, for example, coated abrasive products. The curing properties of binders having different levels of aryl phosphite are compared. Unexpected improvements in viscosity were observed at relatively low levels of aryl phosphite in the binder. For example, for DPP levels of 0.2 to 0.3%, viscosity increased 32% and 334%, respectively. At higher DPP levels, hardening was even more rapid. Additionally, for TPP levels of 1.8 and 5.0%, viscosity increased 17% and 52%, respectively. Increasing the temperature along with an effective amount of aryl phosphite can also accelerate curing in the binders of the present invention.

There has been disclosed in accordance with the principles of the present invention a curable urea formaldehyde binder composition including an aryl phosphite hardener that acts as an accelerator in a time released fashion. The time released curable urea formaldehyde binder composition is useful, for example, in coated abrasive articles. Although the above examples are intended to be representative of the invention, they are not intended to limit the scope of the appended claims. It will be apparent to those skilled in the art that modifications may be made therein without departing from the spirit of the invention and the scope of the appended claims.

What is claimed is:

1. A curable binder composition, comprising:
   urea formaldehyde resin;
   an aryl phosphite; and
   at least one catalyst selected from the group consisting of aluminum chloride ammonium chloride, and combinations thereof.

2. The curable binder of claim 1 wherein the aryl phosphite is present in an amount ranging from about 0.05% by weight to about 15% by weight, based on the total weight of the resin.

3. The curable binder of claim 1 wherein the urea formaldehyde resin has a urea to formaldehyde ratio ranging from about 1:1 to about 1:3.5.

4. The curable binder of claim 1 wherein the urea formaldehyde resin has a pH range of from about 4 to about 9.

5. The curable binder of claim 2 wherein the urea formaldehyde resin has a pH range of from about 4 to about 9.

6. The curable binder of claim 3 wherein the urea formaldehyde resin has a pH range of from about 4 to about 9.

7. The curable binder of claim 1 wherein the aryl phosphite is selected from the group consisting of diphenyl phosphite and triphenyl phosphite.

8. A curable binder composition, comprising:
   a urea formaldehyde resin having a urea to formaldehyde ratio ranging from about 1:1 to about 1:3.5;
   a 25% ammonium chloride solution in an amount ranging from about 2% to about 10% by weighs based on the total weight of the resin;
   a 28% aluminum chloride solution in an amount ranging from about 0.1% to about 2% by weight, based on the total weight of the resin;
   water in an amount ranging from about 5% to about 20% by weight, based on the total weight of the resin; and
   and aryl phosphate in an amount ranging from about 0.05% to about 15% by weight, based on the total weight of the resin.

9. The curable binder of claim 8 wherein the aryl phosphite is selected from the group consisting of diphenyl phosphite and triphenyl phosphite.

10. The curable binder of claim 9 wherein the aryl phosphite is diphenyl phosphite, and further wherein diphenyl phosphite is present in an amount ranging from about 0.1% to about 2% by weight, based on the total weight of the resin.

11. The curable binder of claim 10 wherein diphenyl phosphite is present in an amount ranging from about 0.30% to about 2% by weight, based on the total weight of the resin.

12. The curable binder of claim 9 wherein the aryl phosphite is triphenyl phosphite, and further wherein triphenyl phosphite is present in an amount ranging from about 0.25% to about 5% by weight, based on the total weight of the resin.

13. A coated abrasive article including the cured binder of claim 1.

14. A coated abrasive article including the cured binder of claim 8.

15. An engineered wood article including the cured binder of claim 1.

* * * * *